United States Patent
Suzuki et al.

(10) Patent No.: US 11,199,850 B2
(45) Date of Patent: Dec. 14, 2021

(54) ESTIMATION DEVICE, CONTROL METHOD, PROGRAM AND STORAGE MEDIUM

(71) Applicant: PIONEER CORPORATION, Tokyo (JP)

(72) Inventors: Masami Suzuki, Kanagawa (JP); Kenji Mito, Kanagawa (JP); Hitoshi Kaneko, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 71 days.

(21) Appl. No.: 15/759,816

(22) PCT Filed: Oct. 5, 2015

(86) PCT No.: PCT/JP2015/078163
§ 371 (c)(1),
(2) Date: Mar. 13, 2018

(87) PCT Pub. No.: WO2017/060947
PCT Pub. Date: Apr. 13, 2017

(65) Prior Publication Data
US 2018/0253105 A1    Sep. 6, 2018

(51) Int. Cl.
*G05D 1/02* (2020.01)
*G01C 21/30* (2006.01)
(Continued)

(52) U.S. Cl.
CPC .......... *G05D 1/0238* (2013.01); *G01C 21/20* (2013.01); *G01C 21/30* (2013.01); *G01C 21/32* (2013.01);
(Continued)

(58) Field of Classification Search
CPC combination set(s) only.
See application file for complete search history.

(56) References Cited

U.S. PATENT DOCUMENTS

| 8,301,374 B2 | 10/2012 | Surampudi et al. |
| 8,473,144 B1 | 6/2013 | Dolgov et al. |

(Continued)

FOREIGN PATENT DOCUMENTS

| JP | 2007-187618 A | 7/2007 |
| JP | 2014-89691 A | 5/2014 |

(Continued)

OTHER PUBLICATIONS

International Search Report for related PCT Application No. PCT/JP2015/078163 dated Dec. 15, 2015; 2 pages.

(Continued)

*Primary Examiner* — Jonathan M Dager
*Assistant Examiner* — Garrett F Evans
(74) *Attorney, Agent, or Firm* — Procopio, Cory, Hargreaves & Savitch LLP

(57) ABSTRACT

Provided is an estimation device capable of estimating a current position with a high degree of accuracy. A driving support system includes: a vehicle mounted device 1 that is mounted on a vehicle and performs a control concerning vehicle driving support; a LIDAR 2; a gyroscope sensor 3; and a vehicle speed sensor 4. The vehicle mounted device 1 acquires, from the LIDAR 2, a measurement value $z_t^k$ indicating a positional relationship between a reference landmark Lk of an index k and the own vehicle. The vehicle mounted device 1 calculates a post estimated value $\hat{x}_t$ by correcting a prior estimated value $x^-_t$ estimated, on the basis of the measurement value $z_t^k$ and a position vector $m^k$ of the reference landmark Lk included in a map DB 10, from a moving speed measured by the vehicle speed sensor 4 and an angular rate measured by the gyroscope sensor 3.

9 Claims, 11 Drawing Sheets

(51) Int. Cl.
*G01C 21/20* (2006.01)
*G01C 21/32* (2006.01)
*G05D 1/00* (2006.01)

(52) U.S. Cl.
CPC ......... *G05D 1/0274* (2013.01); *G05D 1/0088* (2013.01)

(56) References Cited

U.S. PATENT DOCUMENTS

| | | | |
|---|---|---|---|
| 2007/0165967 A1 | 7/2007 | Ando et al. | |
| 2013/0304383 A1* | 11/2013 | Bageshwar | G01C 21/165 701/534 |
| 2014/0121880 A1 | 5/2014 | Dolgov et al. | |
| 2014/0233010 A1* | 8/2014 | Baldwin | G01S 17/89 356/4.01 |
| 2014/0297094 A1 | 10/2014 | Dolgov et al. | |
| 2016/0291134 A1* | 10/2016 | Droz | G01S 17/931 |
| 2016/0334230 A1* | 11/2016 | Ross | G01C 21/3415 |
| 2016/0377437 A1* | 12/2016 | Brannstrom | G01C 21/165 701/501 |
| 2017/0090480 A1* | 3/2017 | Ho | G05D 1/0214 |
| 2017/0364090 A1* | 12/2017 | Grufman | G05D 1/0214 |
| 2018/0045519 A1* | 2/2018 | Ghadiok | G06F 16/5866 |
| 2018/0188742 A1* | 7/2018 | Wheeler | G01C 21/30 |
| 2018/0192059 A1* | 7/2018 | Yang | G01S 17/895 |

FOREIGN PATENT DOCUMENTS

| | | |
|---|---|---|
| JP | 2015-135695 A | 7/2015 |
| WO | 2012/086029 A1 | 6/2012 |

OTHER PUBLICATIONS

Extended European Search Report for related EP App No. 15905767.8 dated May 13, 2019, 9 pgs.

* cited by examiner

ESTIMATION DEVICE, CONTROL METHOD, PROGRAM AND STORAGE MEDIUM

CROSS-REFERENCE TO RELATED APPLICATIONS

This application is a U.S. National Stage entry of PCT Application No: PCT/JP2015/078163 filed Oct. 5, 2015, the contents of which are incorporated herein by reference.

TECHNICAL FIELD

The present invention relates to a technology for estimating a current position with a high degree of accuracy.

BACKGROUND TECHNIQUE

Conventionally, there is known a technology for measuring the distance to a peripheral object. For example, Patent Reference-1 discloses an example of a vehicle equipped with a LIDAR which detects a point group of a surface of an object by performing horizontal scanning with intermittently-emitted laser light and receiving the reflective light (scattering light). Patent Reference-2 discloses a point search device having a map database including longitude and latitude information on target plural points of search.

Patent Reference-1: Japanese Patent Application Laid-open under No. 2014-089691

Patent Reference-2: Japanese Patent Application Laid-open under No. 2015-135695

DISCLOSURE OF INVENTION

Problem to be Solved by the Invention

In the field of autonomous driving and the like, an accurate estimation of the current position is required, and there is, however, a case that conventional approaches for estimating the current position mainly based on output of internal sensors which detect the state of a vehicle are insufficient to perform the accurate estimation. In contrast, neither Patent Reference-1 nor Patent Reference-2 discloses any method for calculating the absolute position of the vehicle with a high degree of accuracy.

The above is an example of the problem to be solved by the present invention. An object of the present invention is to provide an estimate device capable of estimating a current position with a high degree of accuracy.

Means for Solving the Problem

One invention is an estimation device including: an acquisition unit configured to acquire map information; a first acquisition unit configured to acquire first information indicating a distance and an angle to an object situated within a first range; a first estimation unit configured to estimate a position of a moving body based on position information of the object included in the map information and the first information.

Another invention is a control method executed by an estimation device including: an acquisition process to acquire map information; a first acquisition process to acquire first information indicating a distance and an angle to an object situated within a first range; a first estimation process to estimate a position of a moving body based on position information of the object included in the map information and the first information.

Still another invention is a program executed by a computer, the program making the computer function as: an acquisition unit configured to acquire map information; a first acquisition unit configured to acquire first information indicating a distance and an angle to an object situated within a first range; a first estimation unit configured to estimate a position of a moving body based on position information of the object included in the map information and the first information.

DETAILED DESCRIPTION OF THE PREFERRED EMBODIMENTS

Figure 1:
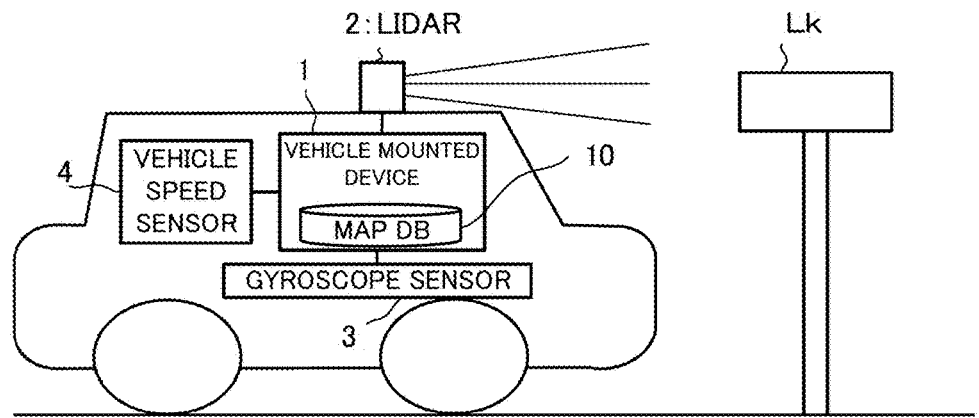
FIG. 1 illustrates a schematic configuration of a driving assistance system according to a first embodiment.

According to a preferable embodiment of the present invention, there is provided an estimation device including: an acquisition unit configured to acquire map information; a first acquisition unit configured to acquire first information indicating a distance and an angle to an object situated within a first range; a first estimation unit configured to estimate a position of a moving body based on position information of the object included in the map information and the first information.

The above estimation device includes an acquisition unit, a first acquisition unit and a first estimation unit. The acquisition unit is configured to acquire map information. The first acquisition unit is configured to acquire first information indicating a distance and an angle (i.e., positional relationship between a moving body and a feature situated within the first range) to an object situated within a first range. The first estimation unit is configured to estimate a position of a moving body based on position information of the object included in the map information and the first information. According to this mode, the estimation device can precisely estimate the position of the moving body by using the position information on a feature registered on the map information.

In one mode of the estimation device, the estimation device further includes a second estimation unit configured to calculate a first estimated position that is an estimated position of a current position of the moving body, wherein the first estimation unit estimates the position of the moving body based on the first estimated position and a difference between the first information and second information, the second information indicating a positional relationship between the object and the first estimated position. According to this mode, the estimation device can perform an accurate estimation of the position of the moving body on the basis of the first estimated position estimated by the second estimation unit and the difference between the first information and second information.

In another mode of the estimation device, the second estimation unit calculates the first estimated position at least based on a position of the moving body estimated a predetermined time before. Accordingly, the estimation device can suitably estimate the current position of the moving body in consideration of the position of the moving body estimated a predetermined time before.

In still another mode of the estimation device, the estimation device further includes a second acquisition unit configured to acquire control information of the moving body, wherein the second estimation unit calculates the first estimated position based on the position estimated the predetermined time before and the control information of the moving body. According to this mode, the estimation device can calculate the first estimated position from the position of the moving body estimated a predetermined time before with a high degree of accuracy and low computational burden.

In still another mode of the estimation device, a predicting step, in which the second estimation unit calculates the first estimated position, and an updating step, in which the first estimation unit corrects the first estimated position calculated at the last predicting step based on the difference between the first information and the second information, are alternately executed, and at the predicting step, the second estimation unit calculates the first estimated position at a current time based on the first estimated position corrected at the last updating step prior to the predicting step. According to this mode, by alternately executing the updating step and the predicting step, the estimation device can correct the first estimated position previously calculated and thereby determine the first estimated position at the current time with a high degree of accuracy and low computational burden.

In still another mode of the estimation device, the first acquisition unit acquires the first information from a measurement device which includes an emitting unit, a light receiving unit and an output unit, the emitting unit emitting laser light while changing outgoing direction of the laser light, the light receiving unit receiving the laser light reflected by the object, the output unit outputting the first information based on a light receiving signal outputted by the light receiving unit and the outgoing direction of the laser light received by the light receiving unit and a response delay time of the laser light. According to this mode, the first acquisition unit can suitably generate and output the first information indicating the distance and the angle to the object situated within the first range. Additionally, according to this mode, since the target object of measurement is an three dimensional feature registered in the map information, it is possible to suitably generate the first information by measuring the distance and the orientation to the target feature even in various situations such as nighttime and a situation that compartment lines (white lines) on the road surface are hidden by snow.

In still another mode of the estimation device, the object is an artificial object. Accordingly, the first acquisition unit can stably acquire first information compared to a case that the object is a natural object.

In still another mode of the estimation device, the object is an artificial object periodically arranged. Accordingly, the estimation device can periodically estimate the position of the moving body.

According to another preferable embodiment of the present invention, there is provided a control method executed by an estimation device including: an acquisition process to acquire map information; a first acquisition process to acquire first information indicating a distance and an angle to an object situated within a first range; a first estimation process to estimate a position of a moving body based on position information of the object included in the map information and the first information. By executing the above control method, the estimation device can precisely estimate the position of the moving body while using the position information on a feature registered on the map information.

According to another preferable embodiment of the present invention, there is provided a program executed by a computer, the program making the computer function as: an acquisition unit configured to acquire map information; a first acquisition unit configured to acquire first information indicating a distance and an angle to an object situated within a first range; a first estimation unit configured to estimate a position of a moving body based on position information of the object included in the map information and the first information. By executing the program, a computer can precisely estimate the position of the moving body while using the position information on a feature registered on the map information. Preferably, the program can be treated in a state that it is stored in a storage medium.

EMBODIMENT

Now, preferred embodiments of the present invention will be described below with reference to the attached drawings.

First Embodiment (1) Schematic Configuration

FIG. 1 illustrates a schematic configuration of a driving assistance system according to the first embodiment. The driving assistance system illustrated in FIG. 1 includes a vehicle mounted device 1 which is mounted on a vehicle and which performs a control of the vehicle regarding driving assistance, a LIDAR (Light Detection and Ranging, or Laser Illuminated Detection and Ranging) 2, a gyroscope sensor 3 and a vehicle speed sensor 4.

The vehicle mounted device 1 is electrically connected to the LIDAR 2, the gyroscope sensor 3 and the vehicle speed sensor 4. On the basis of outputs from them, the vehicle mounted device 1 estimates the position (referred to as "own vehicle position") of the vehicle on which the vehicle mounted device 1 is mounted. Then, on the basis of the estimation result of the own vehicle position, the vehicle mounted device 1 performs an autonomous driving control over the vehicle to let the vehicle travel along a determined route. The vehicle mounted device 1 stores a map database (DB) 10 on which road information and information (referred to as "landmark information") on landmarks are registered, wherein each of the landmarks is situated on or around a road and serves as a mark. The landmark information is information in which each index allocated to each landmark is at least associated with position information on each landmark. On the basis of the landmark information, the vehicle mounted device 1 narrows down (limit) the search range for searching for a landmark through the LIDAR 2 and estimates the own vehicle position by cross-checking the landmark information against the output of the LIDAR 2. Hereinafter, a landmark which serves as a mark (criteria) for the vehicle mounted device 1 to estimate the own vehicle position is referred to as "reference landmark Lk", and the index of the reference landmark Lk is expressed by "k". The reference landmark Lk is an example of the "object" according to the present invention.

For example, a landmark which can be a candidate for the reference landmark Lk is a feature periodically arranged along a road such as a kilometer post, a hundred meter post, a delineator, a traffic infrastructure (e.g., a signage, a direction signboard and a traffic signal), a utility pole and a street lamp. Preferably, the above-mentioned landmark is an artificial material for a steady measurement, and more preferably a feature which is periodically provided for periodical corrections of the own vehicle position. It is noted that the interval of such features does not have to be strictly determined to a constant period and such features only needs to be provided to have a periodicity with some extent like utility poles and street lamps. Additionally, the interval of such features may be different depending on the traveling area.

The LIDAR 2 discretely measures distance to an external object by emitting pulse laser beams within a predetermined angle range (angle of field) with respect to the horizontal direction and the vertical direction to thereby generate three-dimensional point group information indicating the position of the external object. In this case, the LIDAR 2 includes an emitting unit to emit laser light while changing the outgoing direction of the laser light, a light receiving unit to receive the reflective light (scattering light) of the emitted laser light and an output unit to output scan data based on the receiving signal outputted by the light receiving unit. The scan data is generated on the basis of the outgoing direction of the laser light received by the light receiving unit and the response delay time of the laser light specified on the basis of the above-mentioned light receiving signal. The LIDAR 2 according to the embodiment is directed to the traveling direction of the vehicle in order to scan at least the ahead of the vehicle. Each of the LIDAR 2, the gyroscope sensor 3 and the vehicle speed sensor 4 supplies its output data to the vehicle mounted device 1. The vehicle mounted device 1 is an example of the "estimation device" according to the present invention and the LIDAR 2 is an example of the "measurement device" according to the present invention.

Figure 2:
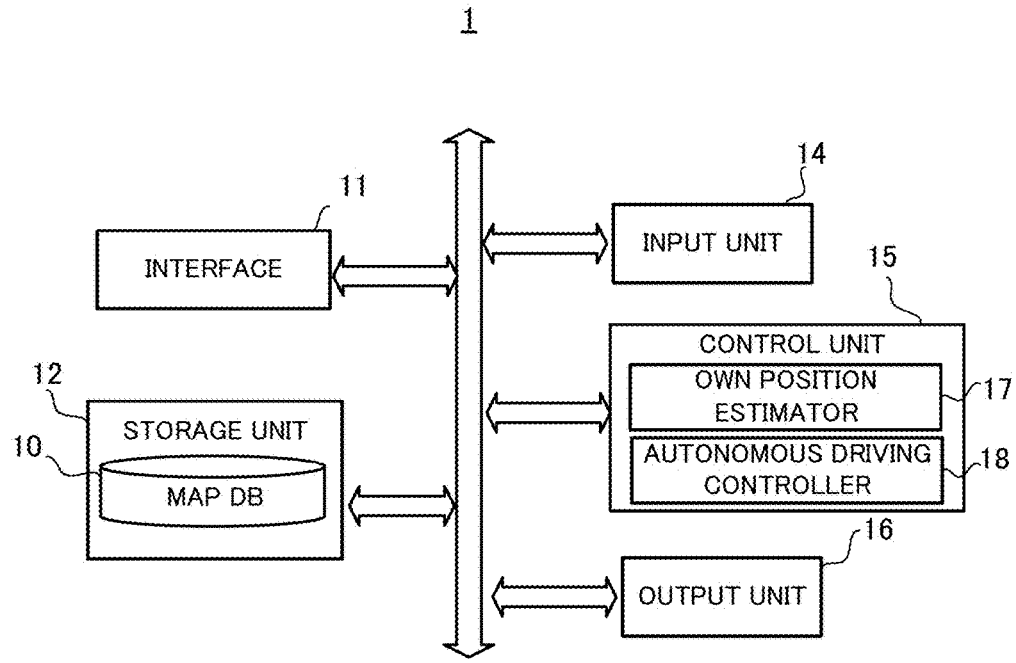
FIG. 2 is a block diagram illustrating a functional configuration of a vehicle mounted device.

FIG. 2 is a block diagram illustrating a functional configuration of the vehicle mounted device 1. The vehicle mounted device 1 mainly includes an interface 11, a storage unit 12, an input unit 14, a control unit 15 and an output unit 16. These elements are connected to each other via a bus line.

The interface 11 acquires output data from sensors including the LIDAR 2, the gyroscope sensor 3 and the vehicle speed sensor 4 and supplies the output data to the control unit 15.

The storage unit 12 stores a program to be executed by the control unit 15 and information necessary for the control unit 15 to execute a predetermined processing. According to the embodiment, the storage unit 12 stores the map DB 10 including the landmark information. It is noted that the map DB 10 may be periodically updated. In this case, for example, via a communication unit, the control unit 15 receives, from a server device which stores map information, partial map information on an area of the own vehicle position, and then updates the map DB 10 with the partial map information.

The input unit 14 accepts an input for specifying a destination for route search and an input for turning the autonomous driving on or off. The output unit 16 includes a display and/or a speaker which output under the control of the control unit 15.

The control unit 15 includes a CPU for executing programs and controls the entire vehicle mounted device 1. According to the embodiment, the control unit 15 includes an own vehicle position estimator 17 and an autonomous driving controller 18.

The own position estimator 17 corrects, on the basis of the measurement values of the distance and the angle to the reference landmark Lk measured by the LIDAR 2 and the position information of the reference landmark Lk extracted from the map DB 10, the own vehicle position which is estimated based on the output data from the gyroscope sensor 3 and the vehicle speed sensor 4. In this case, on the basis of the state estimation method based on the Bayesian estimation, the own position estimator 17 alternately performs a predicting step and a measuring/updating step. At the predicting step, the own position estimator 17 estimates the own vehicle position from the output data from the gyroscope sensor 3 and the vehicle speed sensor 4, and at the measuring/updating step, the own position estimator 17 corrects the estimated value of the own vehicle position calculated at the last predicting step. In the first embodiment, a description will be given of an example in which the extended Kalman filter is used as one example of the state estimation method based on the Bayesian estimation. The own position estimator 17 is an example of the "acquisition unit", the "first acquisition unit", the "first estimation unit", the "second estimation unit", the "second acquisition unit" and the computer which executes the program according to the present invention.

With reference to the map DB 10, the autonomous driving controller 18 performs an autonomous driving control of the vehicle based on the determined route and the own vehicle position estimated by the own position estimator 17. On the basis of the determined route, the autonomous driving controller 18 determines a target trajectory and controls the position of the vehicle by sending a guide signal to the vehicle so that the gap between the own vehicle position estimated by the own position estimator 17 and the target trajectory is within a predetermined width.

(2) Estimation of Own Vehicle Position by Extended Kalman Filter

Next, a description will be given of the estimation process of the own vehicle position executed by the own position estimator 17.

(2-1) Basic Explanation

Hereinafter, the basic premise of the process executed by the own position estimator 17 will be explained. Hereinafter, the own vehicle position is expressed by a state variable vector "x=(x, y, θ)". Furthermore, "⁻" is added to the top of the character of an estimated value that is tentatively estimated at the predicting step and "^" is added to the top of the character of an estimated value more precisely estimated and updated at the measuring/updating step. For the sake of convenience of explanation, a character to which "—" or "^" is added on the top is expressed in the specification as "A'" or "A—" ("A" stands for a character).

Figure 3:
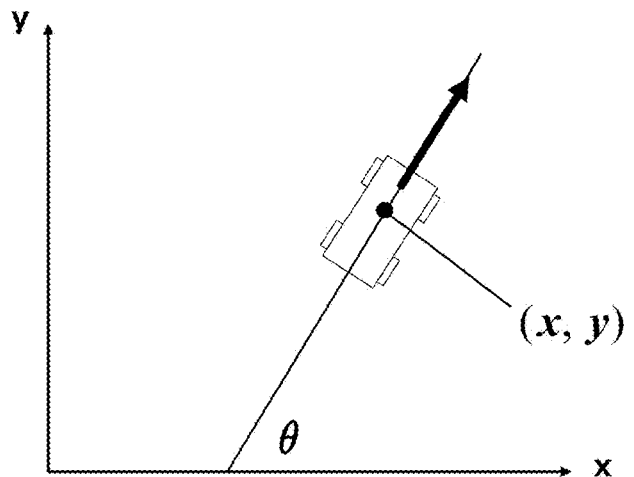
FIG. 3 illustrates the own vehicle position on a two dimensional orthogonal coordinates.

FIG. 3 illustrates a state variable vector x on the two dimensional orthogonal coordinates. As illustrated in FIG. 3, the own vehicle position on a plane defined in the two dimensional x-y orthogonal coordinates is expressed by the coordinates "(x, y)" and the orientation of the own vehicle "θ". The orientation θ herein is defined as an angle between the traveling direction of the vehicle and the x axis. For example, the coordinates "(x, y)" indicates the absolute position expressed by the combination of the longitude and the latitude.

Figure 4:
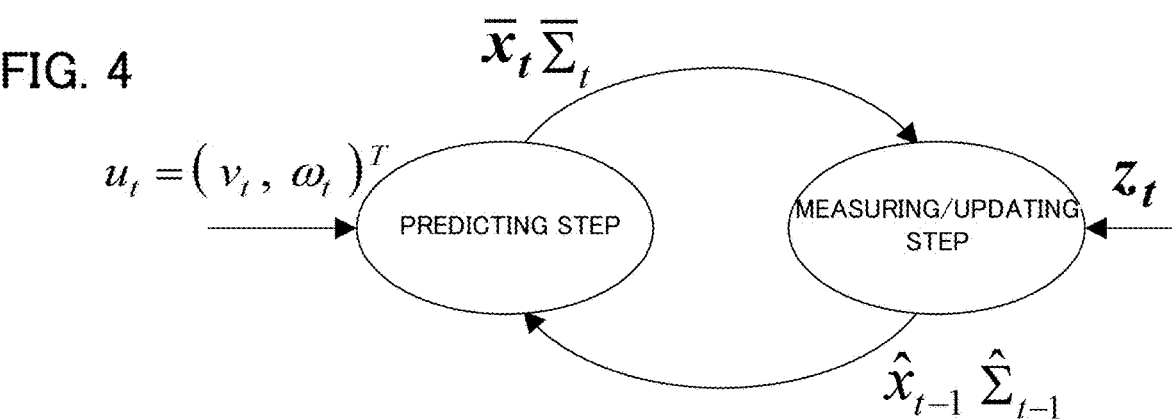
FIG. 4 illustrates a schematic relationship between a predicting step and a measuring/updating step.

FIG. 4 illustrates a schematic relationship between the predicting step and the measuring/updating step. As described above, according to a state estimation method based on the Bayesian estimation like the Kalman filter, calculating an estimation value and updating the estimation value are sequentially executed through the two-step processing in which the predicting step and the measuring/updating step are alternately executed. Thus, according to the embodiment, calculating an estimated value of the state variable vector x and updating the estimated value are sequentially executed by repeating the predicting step and the measuring/updating step. Hereinafter, the state variable vector at the reference time (i.e., current time) as a target of calculation is expressed as "$\bar{x}_t$" or "$\hat{x}_t$".

At the predicting step, by applying the moving speed "v" of the vehicle and the angular rate "ω" (which are collectively expressed hereinafter as "control value $u_t=(v_t, \omega_t)^T$") to the state variable vector $\hat{x}_{t-1}$ at the time t−1 calculated at the last measuring/updating step, the own position estimator 17 calculates an estimated value (referred to as "prior estimated value") $\bar{x}_t$ of the own vehicle position at the time t. The control value $u_t$ is an example of the "control information" according to the present invention, and each of the prior estimated value $\bar{x}_t$ and a post estimated value $\hat{x}_t$ is an example of the "first estimated position" according to the present invention. At the same time, the own position estimator 17 calculates, from a covariance matrix "$\hat{\Sigma}_{t-1}$" calculated at the time t−1 of the last measuring/updating step, a covariance matrix (referred to as "prior covariance matrix") "$\bar{\Sigma}_t$" corresponding to the error distribution of the prior estimated value $\bar{x}_t$.

At the measuring/updating step, the own position estimator 17 acquires a measurement value "$z_t$" of the reference landmark Lk measured by the LIDAR 2 and the estimated measurement value "$\hat{z}_t$" of the above-mentioned reference landmark Lk calculated from the prior estimated value $\bar{x}_t$ by modeling the measurement process of the LIDAR 2. As described later, the measurement value $z_t$ is a two-dimensional vector indicating the distance and the scan angle of the reference landmark Lk measured at the time t by the LIDAR 2. Then, as indicated by the following equation (1), the own position estimator 17 multiples the difference between the measurement value $z_t$ and the estimated measurement value $\hat{z}_t$ by a Kalman gain "Kt" which is determined at another calculation and add it to the prior estimated value $\bar{x}_t$. Thereby, the own position estimator 17 calculates the updated state variable vector (referred to as "post estimated value") $\hat{x}_t$.

[First Equation]

$$\hat{x}_t = \bar{x}_t + K_t(z_t - \hat{z}_t) \quad (1)$$

At the measuring/updating step, in the same way as the predicting step, the own position estimator 17 calculates, from the prior covariance matrix $\bar{\Sigma}_t$, a covariance matrix (referred to as "post covariance matrix") "$\hat{\Sigma}_t$" corresponding to the error distribution of the post estimated value $\hat{x}_t$.

(2-2) Process Overview

Figure 5:
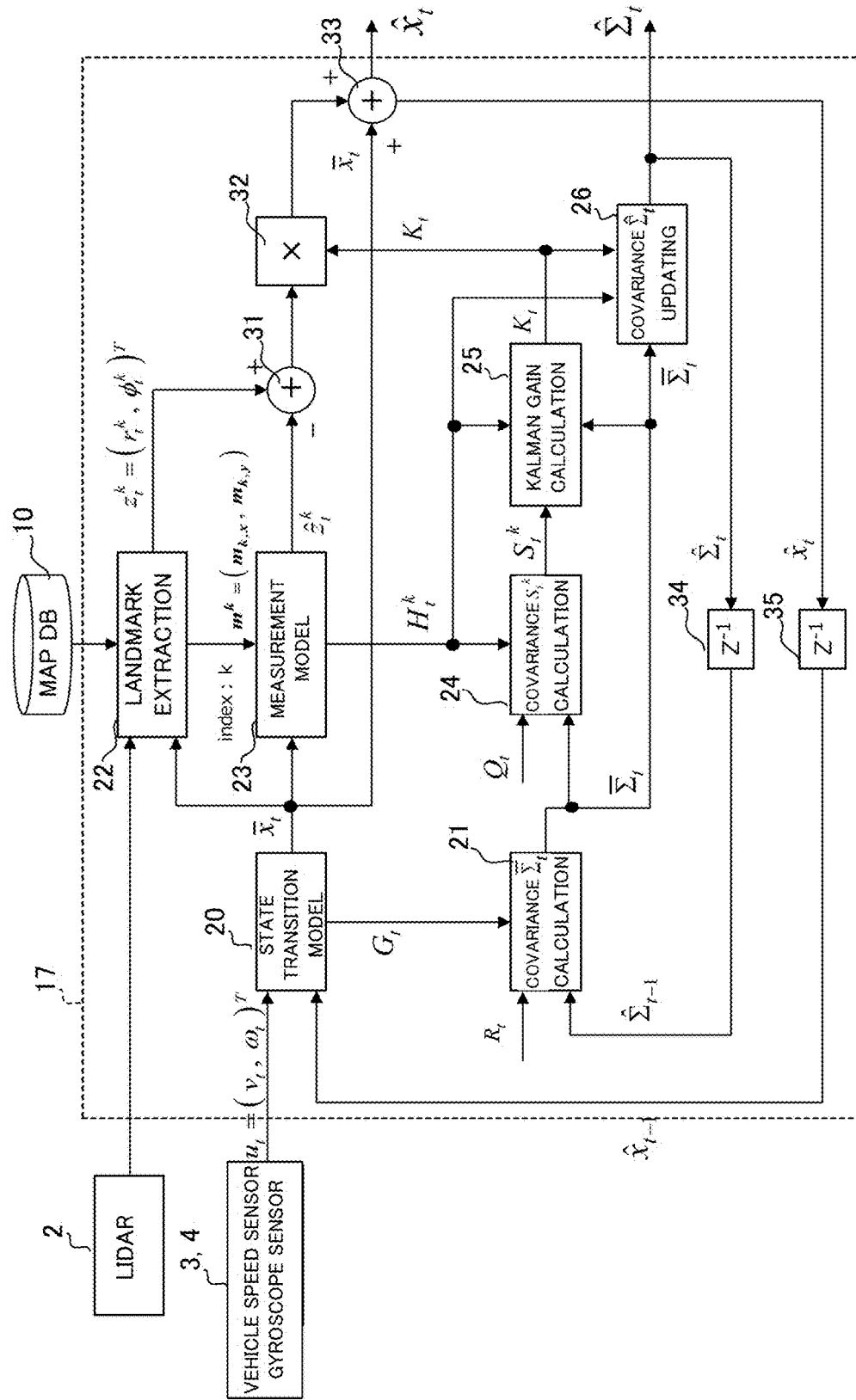
FIG. 5 illustrates a block diagram which indicates a functional configuration of an own position estimator.

FIG. 5 illustrates a block diagram which indicates a functional configuration of the own position estimator 17. The own position estimator 17 mainly includes a state transition model block 20, a covariance calculation block 21, a landmark extraction block 22, a measurement model block 23, a covariance calculation block 24, a Kalman gain calculation block 25, a covariance updating block 26, operation blocks 31 to 33, unit delay blocks 34 and 35.

Figure 6:
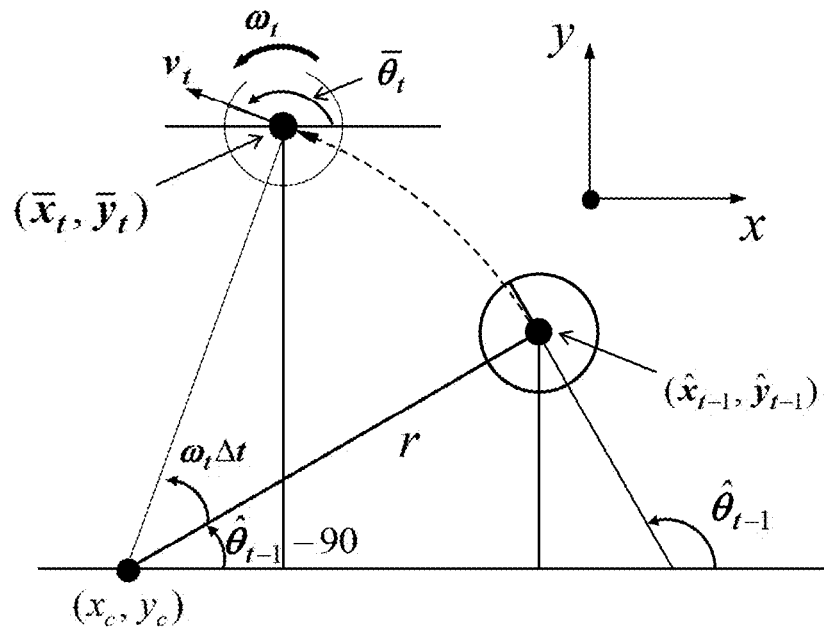
FIG. 6 is a diagram illustrating the own vehicle position before and after an imaginary circular motion expressed by each variable.

On the basis of the control value $u_t=(v_t, \omega_t)^T$, the state transition model (speed action model) block 20 calculates the prior estimated value $\bar{x}_t=(\bar{x}_t, \bar{y}_t, \bar{\theta}_t)^T$ from the post estimated value $\hat{x}_{t-1}$ at the time t−1. FIG. 6 is a diagram illustrating a relationship between the prior estimated value "$\bar{x}_t$", "$\bar{y}_t$", "$\bar{\theta}_t$" at the reference time t and post estimated value "$\hat{x}_{t-1}$", "$\hat{y}_{t-1}$", "$\hat{\theta}_{t-1}$" at the time t−1. According to the geometric relationship illustrated in FIG. 6, the prior estimated value $\bar{x}_t=(\bar{x}_t, \bar{y}_t, \bar{\theta}_t)^T$ is expressed by the following equation (2). The symbol "Δt" indicates the time difference between the time t and the time t−1.

[Second Equation]

$$\bar{x}_t = \begin{pmatrix} \bar{x}_t \\ \bar{y}_t \\ \bar{\theta}_t \end{pmatrix} \quad (2)$$

$$= \hat{x}_{t-1} + \begin{pmatrix} -\frac{v_t}{\omega_t}\sin\hat{\theta}_{t-1} + \frac{v_t}{\omega_t}\sin(\hat{\theta}_{t-1}+\omega_t\Delta t) \\ \frac{v_t}{\omega_t}\cos\hat{\theta}_{t-1} - \frac{v_t}{\omega_t}\cos(\hat{\theta}_{t-1}+\omega_t\Delta t) \\ \omega_t\Delta t \end{pmatrix}$$

$$= \begin{pmatrix} \hat{x}_{t-1} \\ \hat{y}_{t-1} \\ \hat{\theta}_{t-1} \end{pmatrix} + \begin{pmatrix} -\frac{v_t}{\omega_t}\sin\hat{\theta}_{t-1} + \frac{v_t}{\omega_t}\sin(\hat{\theta}_{t-1}+\omega_t\Delta t) \\ \frac{v_t}{\omega_t}\cos\hat{\theta}_{t-1} - \frac{v_t}{\omega_t}\cos(\hat{\theta}_{t-1}+\omega_t\Delta t) \\ \omega_t\Delta t \end{pmatrix}$$

Thus, the state transition model block 20 calculates the prior estimated value $\bar{x}_t$ from the post estimated value $\hat{x}_{t-1}$ at the time t−1 and the control value $u_t=(v_t, \omega_t)^T$ by using the equation (2).

The covariance calculation block 21 calculates the prior covariance matrix $\bar{\Sigma}_t$ based on the following equation (3) by using a matrix "Rt" and a Jacobian matrix "Gt", wherein the matrix Rt indicates an error distribution of the control value $u_t$ converted into the three dimensional coordinate system of the state variable vector (x, y, θ) and the Jacobian matrix Gt is acquired by linearizing the state transition model indicated by the equation (2) around the post estimated value $\hat{x}_{t-1}$.

[Third Equation]

$$\bar{\Sigma}_t = G_t \hat{\Sigma}_{t-1} G_t^T + R_t \quad (3)$$

Here, the Jacobian matrix Gt is expressed by the following equation (4).

[Fourth Equation]

$$G_t = \begin{pmatrix} 1 & 0 & -\frac{v_t}{\omega_t}\cos\hat{\theta}_{t-1} + \frac{v_t}{\omega_t}\cos(\hat{\theta}_{t-1} + \omega_t \Delta t) \\ 0 & 1 & -\frac{v_t}{\omega_t}\sin\hat{\theta}_{t-1} + \frac{v_t}{\omega_t}\sin(\hat{\theta}_{t-1} + \omega_t \Delta t) \\ 0 & 0 & 1 \end{pmatrix} \quad (4)$$

On the basis of the output of the LIDAR 2 and the prior estimated value $\overline{x}_t$, the landmark extraction block 22 extracts the position vector "$m^k=(m_{k,x}, m_{k,y})$" of the reference landmark Lk on the x-y coordinate system from the map DB 10. The landmark extraction block 22 supplies the operation block 31 with the measurement value "$z_t^k=(r_t^k, \phi_t^k)^T$" that is measured by the LIDAR 2 and that corresponds to the extracted reference landmark Lk with the index k. Here, the measurement value $z_t^k$ is a vector value whose elements are the distance "$r_t^k$" and the scan angle "$\phi_t^k$", wherein the distance $r_t^k$ indicates the distance to the landmark with the index k and the scan angle $\phi_t^k$ indicates an angle between the traveling direction of the vehicle and the landmark with the index k. The measurement value $z_t^k$ is an example of the "first information" according to the present invention. The method for specifying the reference landmark Lk by the landmark extraction block 22 will be described later.

Figure 7:
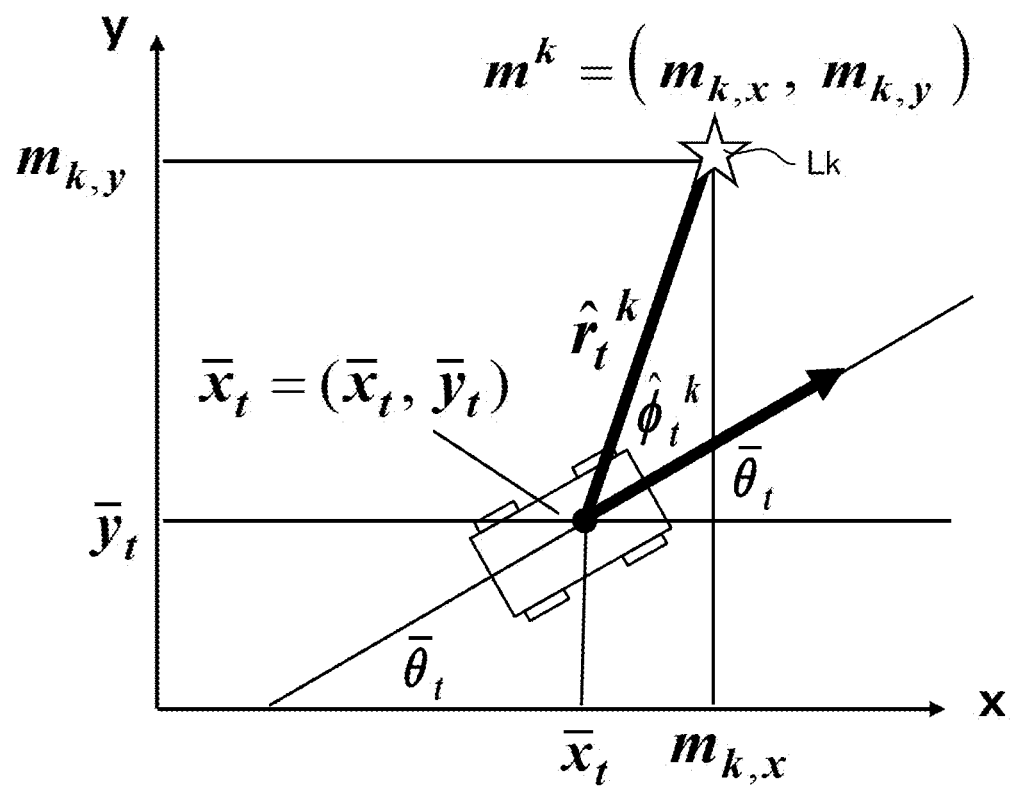
FIG. 7 illustrates a relationship between the position of a landmark and the own vehicle position.

The measurement model block 23 calculates an estimated value "$\hat{z}_t^k=(\hat{r}_t^k, \hat{\phi}_t^k)^T$" of the measurement value $z_t^k$ from the position vector $m^k$ of the reference landmark Lk with the index k and the prior estimated value $\overline{x}_t$ to supply it to the operation block 31. The symbol "$\hat{r}_t^k$" herein indicates a distance from the position of the prior estimated value $\overline{x}_t$ to the landmark with the index k and the symbol "$\hat{\phi}_t^k$" indicates a scan angle to the landmark with the index k with respect to the prior estimated value $\overline{x}_t$. FIG. 7 illustrates a relationship between the position of the reference landmark Lk and the own vehicle position. On the basis of the geometrical relationship illustrated in FIG. 7, the distance $\hat{r}_t^k$ is expressed as the following equation (5).

[Fifth Equation]

$$\hat{r}_t^k = \sqrt{(m_{k,x}-\overline{x}_t)^2+(m_{k,y}-\overline{y}_t)^2} \quad (5)$$

Additionally, on the basis of the relationship illustrated in FIG. 7, the following equation (6) is satisfied.

[Sixth Equation]

$$\tan(\hat{\phi}_t^k + \overline{\theta}_t) = \frac{m_{k,y}-\overline{y}_t}{m_{k,x}-\overline{x}_t} \quad (6)$$

Thus, the scan angle $\hat{\phi}_t^k$ is expressed as the following equation (7).

[Seventh Equation]

$$\hat{\phi}_t^k = \tan^{-1}\left(\frac{m_{k,y}-\overline{y}_t}{m_{k,x}-\overline{x}_t}\right) - \overline{\theta}_t \quad (7)$$

Thus, with reference to the equations (5) and (7), the measurement model block 23 calculates the estimated value $\hat{z}_t^k=(\hat{r}_t^k, \hat{\phi}_t^k)^T$ corresponding to the measurement value $z_t^k$ and supplies it to the operation block 31. The estimated value $\hat{z}_t^k=(\hat{r}_t^k, \hat{\phi}_t^k)^T$ is an example of the "second information" according to the present invention.

Furthermore, the measurement model block 23 calculates a Jacobian matrix "$H_t^k$" which is acquired by linearizing the measuring model indicated by the equations (5) and (7) around the prior estimated value $\overline{x}_t$. The Jacobian matrix $H_t^k$ is expressed by the following equation (8).

[Eighth Equation]

$$H_t^k = \begin{pmatrix} -(m_{k,x}-\overline{x}_t)/\hat{r}_t^k & -(m_{k,y}-\overline{y}_t)/\hat{r}_t^k & 0 \\ (m_{k,y}-\overline{y}_t)/\hat{r}_t^{k2} & -(m_{k,x}-\overline{x}_t)/\hat{r}_t^{k2} & -1 \end{pmatrix} \quad (8)$$

The measurement model block 23 supplies the Jacobian matrix $H_t^k$ to the covariance calculation block 24, the Kalman gain calculation block 25 and the covariance updating block 26, respectively.

On the basis of the following equation (9), the covariance calculation block 24 calculates a covariance matrix "$S_t^k$" that is necessary to calculate the Kalman gain $K_t^k$.

[Ninth Equation]

$$S_t^k = H_t^k \overline{\Sigma}_t [H_t^k]^T + Q_t \quad (9)$$

The covariance calculation block 24 supplies the calculated covariance matrix $S_t^k$ to the Kalman gain calculation block 25.

The Kalman gain calculation block 25 calculates the Kalman gain $K_t^k$ based on the following equation (10).

[Tenth Equation]

$$K_t^k = \overline{\Sigma}_t [H_t^k]^T [S_t^k]^{-1} \quad (10)$$

With reference to the following equation (11) in which a unit matrix "I" is used, the covariance updating block 26 calculates the post covariance matrix $\hat{\Sigma}_t$ based on the prior covariance matrix $\overline{\Sigma}_t$ supplied from the covariance calculation block 21, the Jacobian matrix $H_t^k$ supplied from the measurement model block 23 and the Kalman gain $K_t^k$ supplied from the Kalman gain calculation block 25.

[Eleventh Equation]

$$\hat{\Sigma}_t = (I - K_t^k H_t^k) \overline{\Sigma}_t \quad (11)$$

The operation block 31 calculates the difference (i.e., "$z_t^k - \hat{z}_t^k$") between the measurement value $z_t^k$ supplied from the landmark extraction block 22 and the estimated value $\hat{z}_t^k$ supplied from the measurement model block 23. The operation block 32 multiplies the value calculated by the operation block 31 by the Kalman gain $K_t^k$ supplied from the Kalman gain calculation block 25. As indicated by the following equation (12), the operation block 33 calculates the post estimated value $\hat{x}_t$ by adding the value calculated by the operation block 32 to the prior estimated value $\overline{x}_t$.

[Twelfth Equation]

$$\hat{x}_t = \overline{x}_t + K_t^k (z_t^k - \hat{z}_t^k) \quad (12)$$

As described above, the own position estimator 17 can precisely perform the state estimation by sequentially repeating the predicting step and the measuring/updating step. In addition to the extended Kalman filter, various filters developed to perform the Bayesian estimation are available as a state estimation filter to be used at these steps. For example, instead of the extended Kalman filter, the unscented Kalman filter and/or the particle filter may be used.

(2-3) Detail of Landmark Extraction Block

Figure 8:
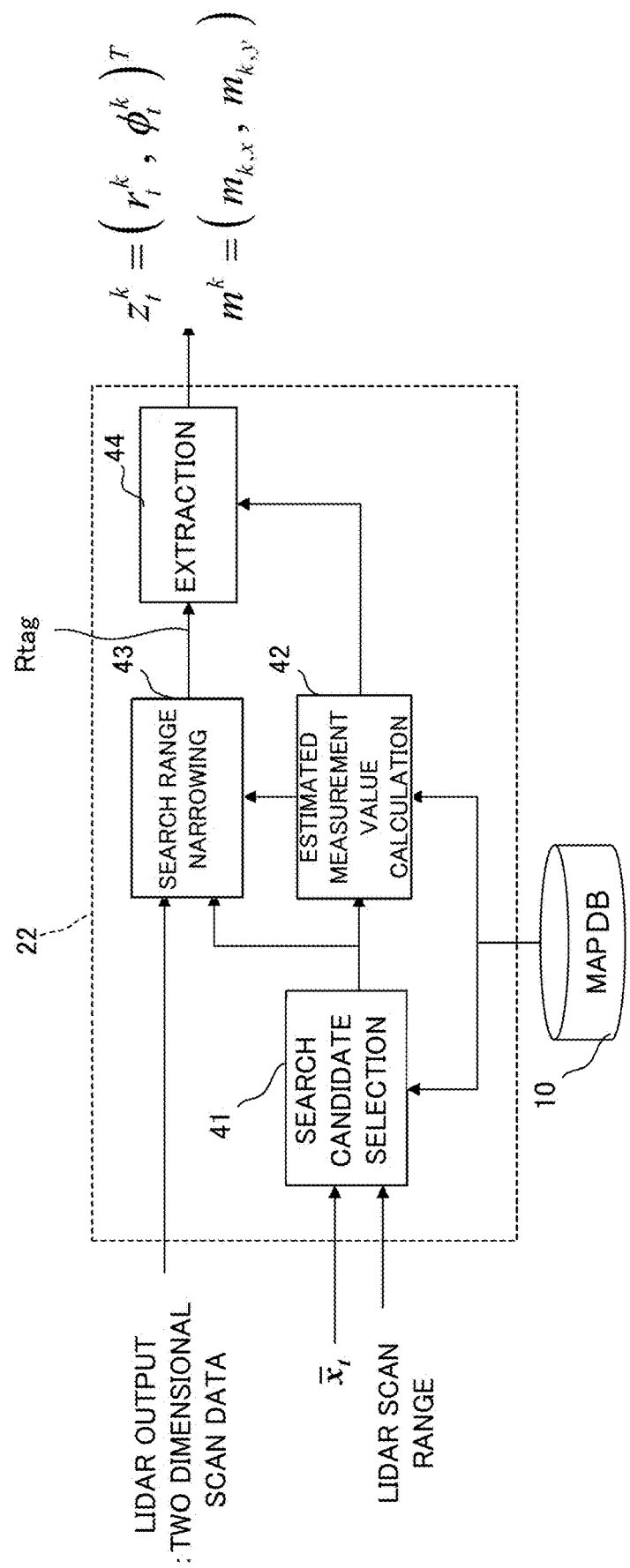
FIG. 8 illustrates a functional configuration of the landmark extraction block.

FIG. 8 illustrates a functional configuration of the landmark extraction block 22. As illustrated in FIG. 8, the landmark extraction block 22 includes a search candidate selection block 41, an estimated measurement value calculation block 42, a search range narrowing block 43 and an extraction block 44.

On the basis of the prior estimated value $\overline{x}_t$, the search candidate selection block 41 recognizes a range (referred to as "scan range Rsc") to be scanned by the LIDAR 2, and selects a landmark situated within the recognized scan range Rsc from the map DB 10. In this case, as the scan range Rsc, the search candidate selection block 41 determines an area within the maximum ranging distance of the LIDAR 2 from the position ($\overline{x}_t$, $\overline{y}_t$) and within a margin of plus or minus 90 degree angle from the orientation $\overline{\theta}_t$. Then, the search candidate selection block 41 extracts the position vector $m^k = (m_{k,x}, m_{k,y})$ corresponding to the index k from the map DB 10. The scan range Rsc is an example of the "first range" according to the present invention.

The estimated measurement value calculation block 42 calculates the estimated value $\hat{z}_t^k = (\hat{r}_t^k, \hat{\varphi}_t^k)^T$ corresponding to the measurement value $z_t^k$ based on the prior estimated value $\overline{x}_t$ and the position vector $m^k$ with the index k extracted from the map DB 10. Specifically, the estimated measurement value calculation block 42 calculates the estimated value $\hat{z}_t^k = (\hat{r}_t^k, \hat{\varphi}_t^k)^T$ based on the above-mentioned equations (5) and (7).

The search range narrowing block 43 determines such a range (referred to as "search range Rtag") of the scan range Rsc that the difference between the scan angle and the angle $\hat{\varphi}_t^k$ is within a predetermined search angular width "$\Delta_\varphi$" and that the difference between the ranging distance and the distance $\hat{r}_t^k$ is within a search distance width "$\Delta_r$". The search angular width $\Delta_\varphi$ and the search distance width $\Delta_r$ are predetermined through experimental trials in consideration of a supposed margin of error between the measurement value $z_t^k$ and the estimated value $\hat{z}_t^k$, respectively. The above-mentioned margin of error depends on the estimate accuracy of the prior estimated value $\overline{x}_t = (\overline{x}_t, \overline{y}_t, \overline{\theta}_t)^T$ that is necessary to calculate the estimated value $\hat{z}_t^k = (\hat{r}_t^k, \hat{\varphi}_t^k)^T$ (see the equations (5) and (7)) and the accuracy of the LIDAR 2 which outputs the scan data corresponding to the measurement value $z_t^k$. Thus, Preferably, the search angular width $\Delta_\varphi$ and the search distance width $\Delta_r$ are determined in consideration of at least one of the estimate accuracy of the prior estimated value $\overline{x}_t$ and the accuracy of the LIDAR 2. Specifically, the higher the estimate accuracy of the prior estimated value $\overline{x}_t$ is, the shorter the search angular width $\Delta_\varphi$ and the search distance width $\Delta_r$ becomes. Additionally, the higher the accuracy of the LIDAR 2 is, the shorter the search angular width $\Delta_\varphi$ and the search distance width $\Delta_r$ becomes.

On the basis of the search range Rtag determined by the search range narrowing block 43, the extraction block 44 extracts, from all scan data of the LIDAR 2 at the time t, the measurement value $z_t^k$ corresponding to the point group of the reference landmark Lk. Specifically, the extraction block 44 determines whether or not there is a measurement value $z_t^i$ ("i" is an index of each beam emitted by the LIDAR 2 at one scanning cycle) which satisfies the following equations (13) and (14).

[Thirteenth Equation]

$$\text{for all } i: \hat{\varphi}_t^k - \Delta_\varphi \leq \varphi_t^i \leq \hat{\varphi}_t^k + \Delta_\varphi \tag{13}$$

[Fourteenth Equation]

$$\hat{r}_t^k - \Delta_r \leq r_t^i \leq \hat{r}_t^k + \Delta_r \tag{14}$$

Then, when there is a measurement value $z_t^i$ that is a combination ($r_t^i, \varphi_t^i$) satisfying the equations (13) and (14), the extraction block 44 determines that the landmark selected by the search candidate selection block 41 actually exists. Then, the extraction block 44 supplies the position vector $m^k$ with the index k to the measurement model block 23 while supplying the measurement value $z_t^i$ that is a combination ($r_t^i, \varphi_t^i$) which satisfying the equations (13) and (14) to the operation block 31 as the measurement value $z_t^k$ corresponding to the point group of the reference landmark Lk.

Preferably, in this case, in order to determine the measurement value $z_t^k$ to supply to the operation block 31, the extraction block 44 may further execute the process of selecting the scan data corresponding to the reference landmark Lk from the scan data included in the search range Rtag.

For example, the extraction block 44 selects the measurement value $z_t^k$ corresponding to the point group of the reference landmark Lk by acquiring from the map DB 10 the shape information of the landmark selected by the search candidate selection block 41 and by performing the process of matching the shape information with the three dimensional shape which the point group of the scan data within the search range Rtag constitutes. In another example, the extraction block 44 selects the measurement value $z_t^k$ corresponding to the point group of the reference landmark Lk by specifying the intensity of the received light corresponding to the scan data within the search range Rtag and by comparing the intensity to preset threshold information. In such a case that there are selected plural measurement values $z_t^k$, the extraction block 44 may supplies any one of the plural selected measurement values $z_t^k$ to the operation block 31 or supplies a representative value selected or calculated through statistical processing from the plural selected measurement values $z_t^k$ to the operation block 31.

Figure 9:
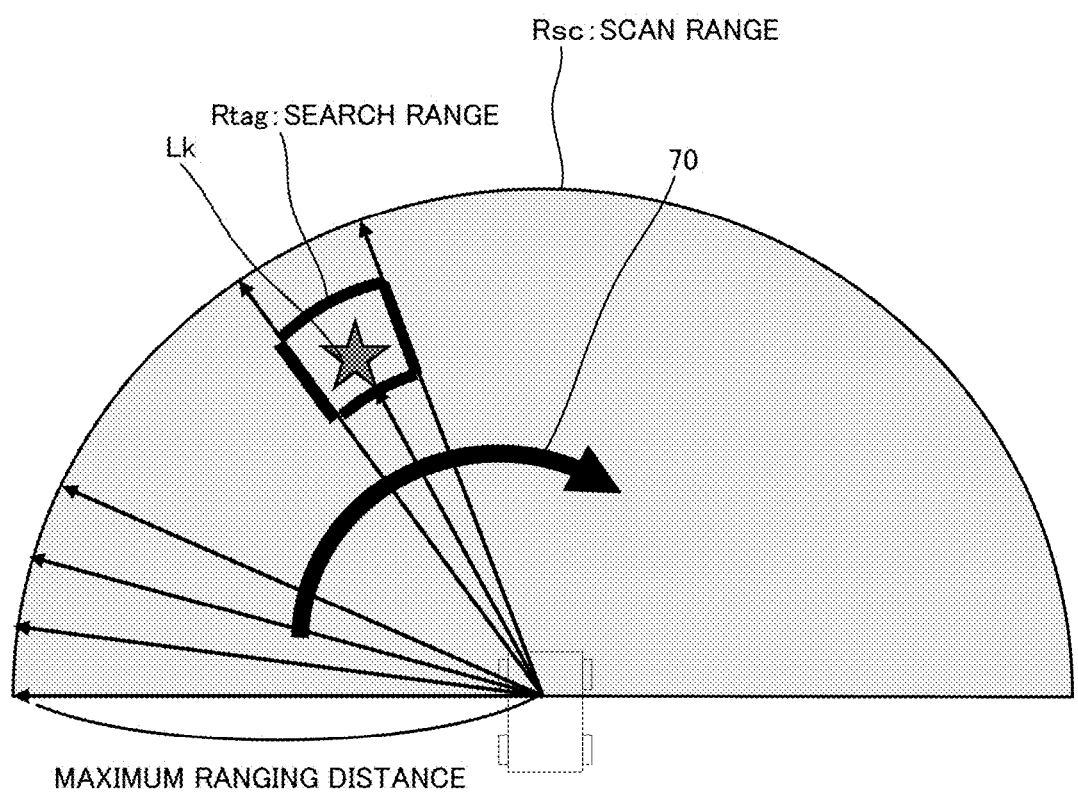
FIG. 9 illustrates a relationship between a scan range of the LIDAR and a search range of a landmark.

FIG. 9 illustrates the relationship between the scan range Rsc and the search range Rtag. In the example according to FIG. 9, the scan range Rsc is a semicircular area that is within a margin of right or left 90 degree angle from the front direction of the vehicle and within the maximum ranging distance from the vehicle. It is noted that the arrow 70 in FIG. 9 indicates the scan direction.

In the example according to FIG. 9, the search candidate selection block 41 first specifies the scan range Rsc based on the prior estimated value $\overline{x}_t$, and specifies a landmark situated in the scan range Rsc as the reference landmark Lk to select the position vector $m^k$ corresponding to the reference landmark Lk. Then, the estimated measurement value calculation block 42 calculates estimated value $\hat{z}_t^k = (\hat{r}_t^k, \hat{\varphi}_t^k)^T$ corresponding to the measurement value $z_t^k$ from the position vector $m^k$ of the reference landmark Lk and the prior estimated value $\overline{x}_t$. The search range narrowing block 43 determines the search range Rtag based on the equations (13) and (14). In a case where there is scan data within the determined search range Rtag, the extraction block 44 supplies the position vector $m^k$ to the measurement model block 23 while supplying the measurement value $z_t^k$ that is based on the scan data included in the search range Rtag to the operation block 31. It is noted that in such a case that there is no scan data within the determined search range Rtag, the own position estimator 17 determines that the reference landmark Lk cannot be detected by the LIDAR 2 and sets the prior estimated value $\overline{x}_t$ as the post estimated value $\hat{x}_t$ while setting the prior covariance matrix $\overline{\Sigma}_t$ as the post covariance matrix $\hat{\Sigma}_t$.

(3) Process Flow (3-1) Overview of Process

Figure 10:
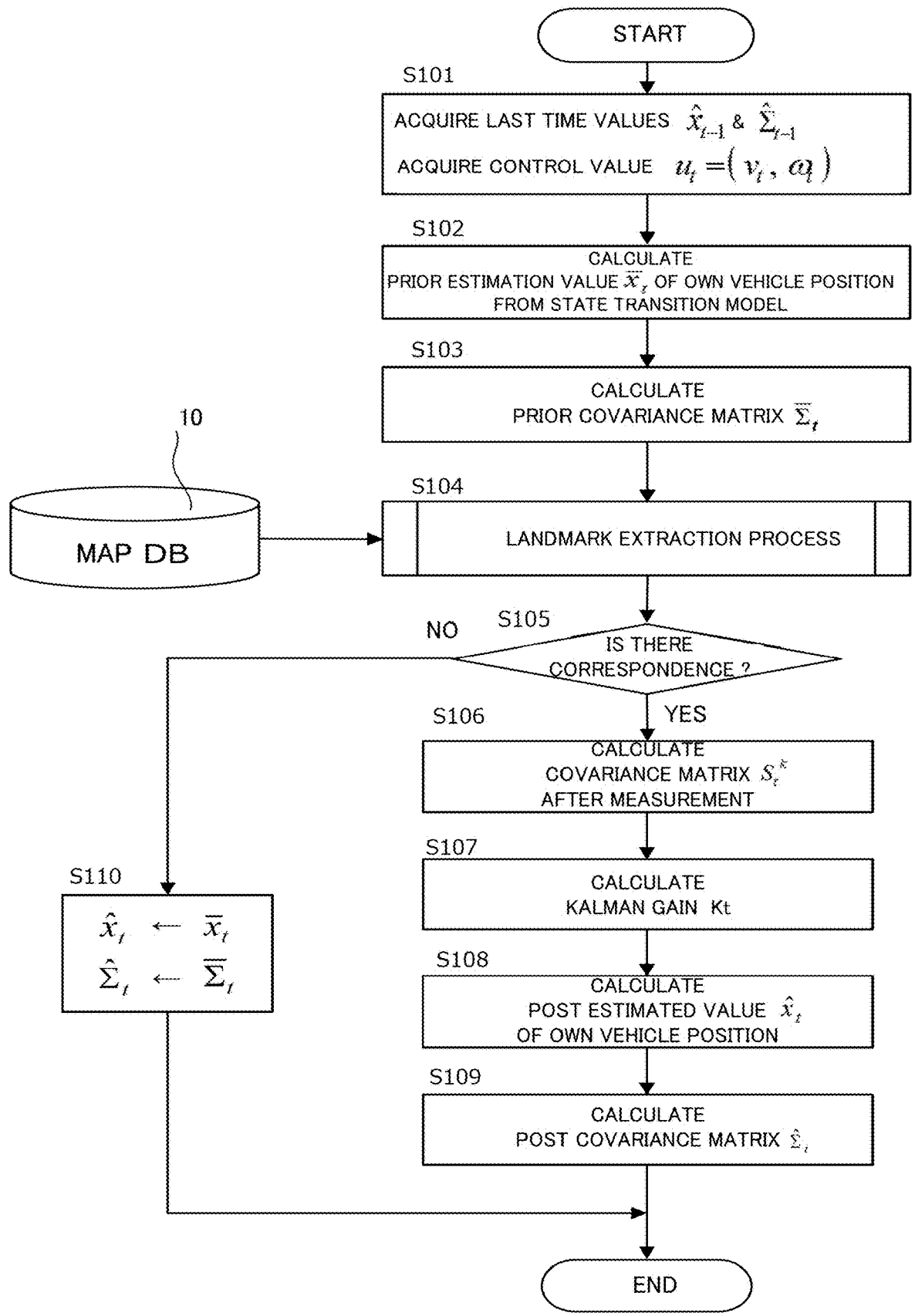
FIG. 10 is a flowchart indicating a procedure of the process executed by the own position estimator according to the first embodiment.

FIG. 10 is a flowchart indicating a procedure of the process executed by the own position estimator 17 according to the first embodiment. The own position estimator 17 repeatedly executes the flowchart in FIG. 10.

First, the own position estimator 17 acquires the post estimated value $\hat{x}_{t-1}$ and the post covariance matrix $\hat{\Sigma}_{t-1}$ at the time t−1 while acquiring the control value $u_t$ at the time t from the gyroscope sensor 3 and the vehicle speed sensor 4 (step S101). Next, the state transition model block 20 of the own position estimator 17 calculates the prior estimated value $\overline{x}_t$ based on the equation (2) (step S102). Then, the covariance calculation block 21 of the own position estimator 17 calculates the prior covariance matrix $\overline{\Sigma}_t$ based on the equation (3) (step S103).

Next, with reference to the map DB 10, the landmark extraction block 22 of the own position estimator 17 executes the landmark extraction process illustrated in FIG. 11 to be mentioned later (step S104). Then, the own position estimator 17 determines whether or not the own position estimator 17 can establish a correspondence between the position vector $m^k$ of a landmark registered on the map DB 10 and the scan data of the LIDAR 2 (step S105). In this case, the own position estimator 17 determines whether or not a predetermined flag which indicates the success of establishing the above correspondence is set on the basis of the landmark extraction process illustrated in FIG. 11.

Then, when the above correspondence is established (step S105; Yes), the covariance calculation block 24 calculates the covariance matrix $S_t^k$ based on the above-mentioned equation (9) (step S106). Next, the Kalman gain calculation block 25 calculates the Kalman gain $K_t^k$ based on the above-mentioned equation (10) (step S107). Then, according to the equation (12), the operation block 33 calculates the difference (i.e., "$z_t^k - \hat{z}_t^k$") between the measurement value $z_t^k$ supplied from the landmark extraction block 22 and the estimated value $\hat{z}_t^k$ supplied from the measurement model block 23 and adds the difference multiplied by the Kalman gain $K_t^k$ to the prior estimated value $\overline{x}_t$ to thereby calculate the post estimated value $\hat{x}_t$ (step S108). In accordance with the equation (11), the covariance updating block 26 calculates the post covariance matrix $\hat{\Sigma}_t$ based on the prior covariance matrix $\overline{\Sigma}_t$ supplied from the covariance calculation block 21, the Jacobian matrix $H_t^k$ supplied from the measurement model block 23 and the Kalman gain $K_t^k$ supplied from the Kalman gain calculation block 25 (step S109). Then, the unit delay block 34 sets the post estimated value $\hat{x}_t$ as the post estimated value $\hat{x}_{t-1}$ and supplies it to the state transition model block 20 and the unit delay block 35 sets the post covariance matrix $\hat{\Sigma}_t$ as the post covariance matrix $\hat{\Sigma}_{t-1}$ and supplies it to the covariance calculation block 21.

In contrast, when the above correspondence cannot be established (step S105; No), the own position estimator 17 sets the prior estimated value $\overline{x}_t$ as the post estimated value $\hat{x}_t$ while setting the prior covariance matrix $\overline{\Sigma}_t$ as the post covariance matrix $\hat{\Sigma}_t$ (step S110).

(3-2) Landmark Extraction Process

Figure 11:
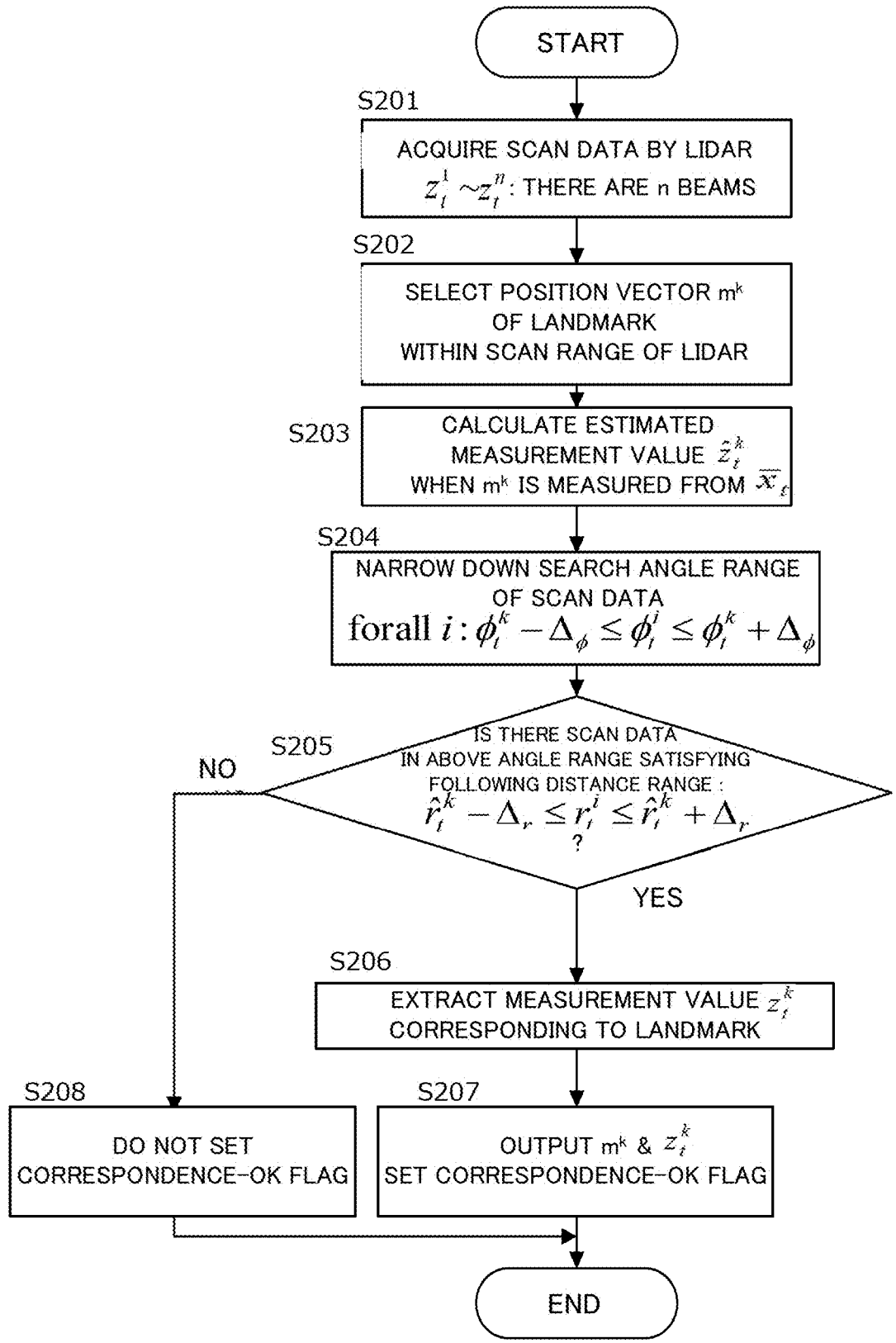
FIG. 11 is a flowchart indicating the detail of the landmark extraction process.

FIG. 11 is a flowchart indicating the detail of the landmark extraction process at step S104 in FIG. 10.

First, the search range narrowing block 43 of the landmark extraction block 22 acquires the scan data of the LIDAR 2 (step S201). It is herein assumed that the LIDAR 2 emits "n" beams at one cycle of scanning while changing the outgoing angle thereof and that the LIDAR 2 outputs the measurement values $z_t^1$ to $z_t^n$ by measuring the receiving light intensity and the response time of each reflective light corresponding to each of the beams.

Next, the search candidate selection block 41 selects from the map DB 10 the position vector $m^k$ of a landmark situated in the scan range Rsc of the LIDAR 2(step S202). In this case, the search candidate selection block 41 specifies, as the scan range Rsc, an area that is within a margin of plus or minus 90 degree angle from the orientation $\overline{\theta}_t$ and within the maximum ranging distance of the LIDAR 2 from the position ($\overline{x}_t$, $\overline{y}_t$). Then, the search candidate selection block 41 extracts the position vector $m^k$ indicating the position in the specified area from the map DB 10.

Thereafter, the estimated measurement value calculation block 42 calculates the estimated value $\hat{z}_t^k = (\hat{r}_t^k, \hat{\phi}_t^k)^T$ corresponding to the measurement value $z_t^k$ on the assumption that the position vector $m^k$ is measured from the prior estimated value $\overline{x}_t$. (step S203). Specifically, the estimated measurement value calculation block 42 calculates the estimated value $\hat{z}_t^k = (\hat{r}_t^k, \hat{\phi}_t^k)^T$ based on the above-mentioned equations (5) and (7).

Next, the search range narrowing block 43 determines the scan angle $\phi_t^i$ (i=1 to n) which satisfies the equation (13) (step S204). The extraction block 44 determines whether or not there is any measurement value $z_t^i$, out of measurement values $z_t^i$ whose scan angle $\phi_t^i$ satisfies the equation (13), whose distance $r_t^i$ is within the range indicated by the equation (14) (step S205). When there is any measurement value $z_t^i$, out of measurement values $z_t^i$ whose scan angle satisfies the equation (13), whose distance $r_t^i$ is within the range indicated by the equation (14) (step S205; Yes), the extraction block 44 further executes the process (e.g., known shape/feature extraction process or process by use of the receiving light intensity) of selecting the measurement value corresponding to the reference landmark Lk from measurement values $z_t^i$ situated in the search range and extracts the selected measurement value as the measurement value $z_t^k$ (step S206). Then, the extraction block 44 outputs the position vector $m^k$ and the measurement value $z_t^k$ that is the scan data corresponding to the position vector $m^k$, and sets a flag indicating the success of establishing the correspondence (step S207). The flag is referred to at the time of the determination process at step S105 in FIG. 10 mentioned above.

In contrast, When there is no measurement value $z_t^i$, out of measurement values $z_t^i$ whose scan angle $\phi_t^i$ satisfies the equation (13), whose distance $r_t^i$ is within the range indicated by the equation (14) (step S205; No), the extraction block 44 does not set the flag indicating the success of establishing the correspondence (step S208).

Second Embodiment

Figure 12:
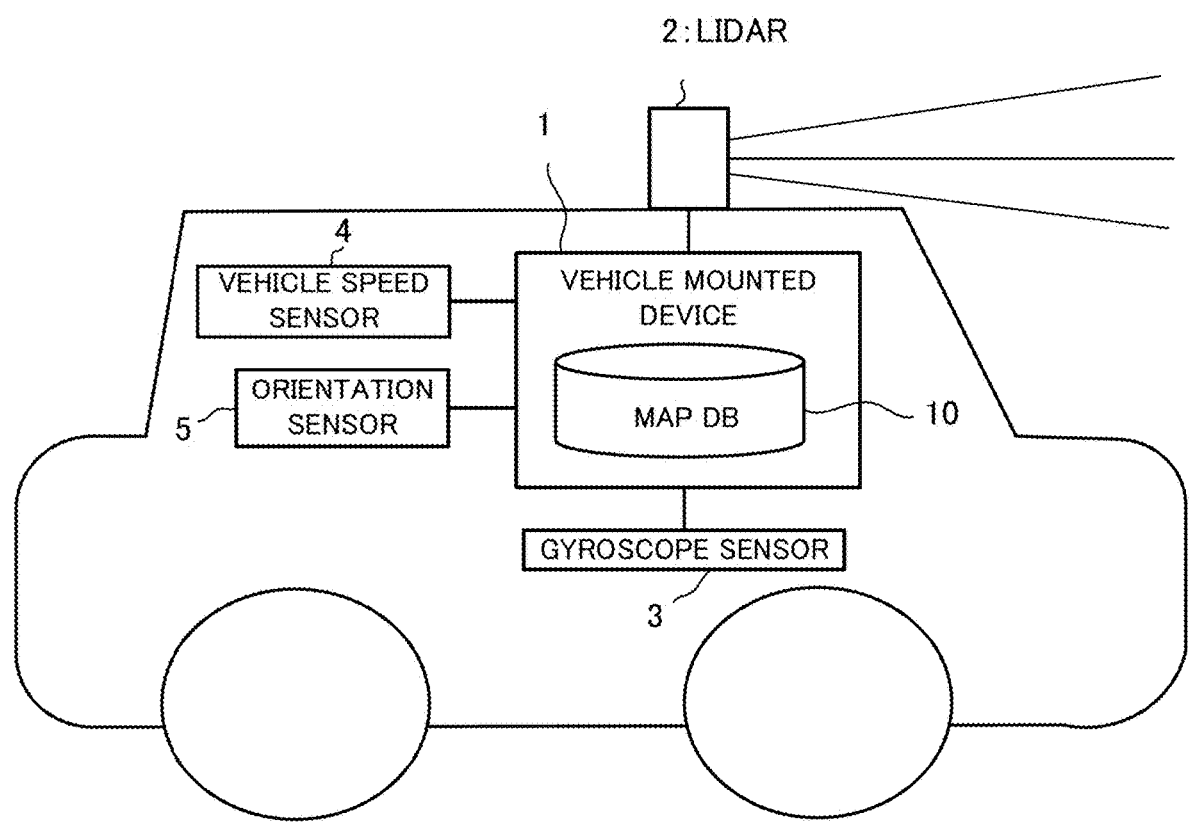
FIG. 12 illustrates a schematic configuration of a driving assistance system according to a second embodiment.

FIG. 12 is a block diagram of a driving assistance system according to the second embodiment. In the example according to FIG. 12, the vehicle mounted device 1 is electrically connected to an orientation sensor 5. Examples of the orientation sensor 5 include a geomagnetic sensor, a compass, and a GPS compass. The orientation sensor 5 supplies the vehicle mounted device 1 with the information on the orientation corresponding to the traveling direction of the vehicle. The vehicle mounted device 1 has a configuration according to FIG. 2 as with the first embodiment, and estimates the own vehicle position based on the landmark information registered on the map DB 10 and various output data from the LIDAR 2, the gyroscope sensor 3, the vehicle speed sensor 4 and the orientation sensor 5. Hereinafter, the same reference numbers as the first embodiment will be provided to the same components as the first embodiment and the explanation thereof will be omitted.

Figure 13:
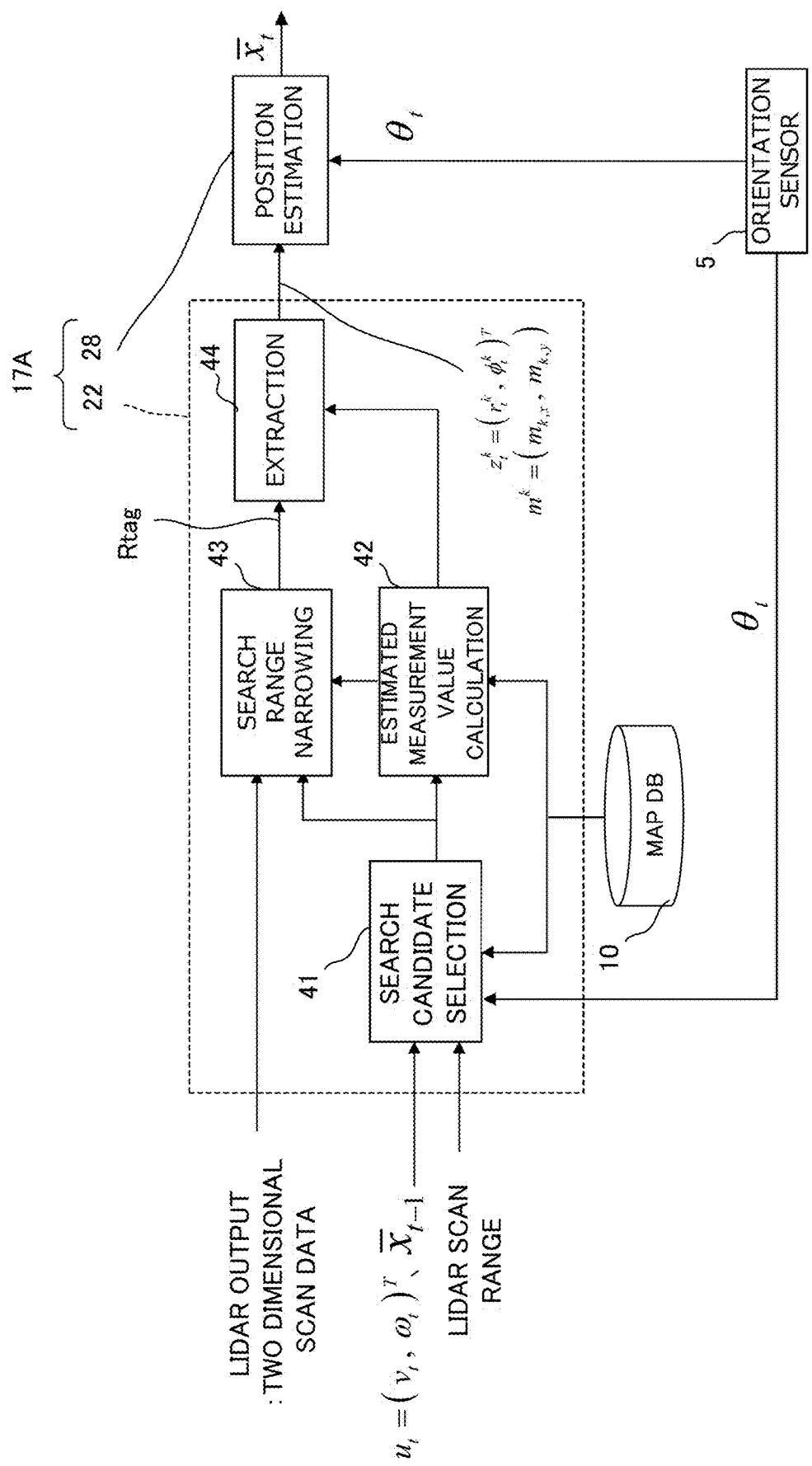
FIG. 13 illustrates a block diagram which indicates a functional configuration of an own position estimator according to the second embodiment.

FIG. 13 illustrates a schematic configuration of the own position estimator 17A of the vehicle mounted device 1 according to the second embodiment. In the example according to FIG. 13, the own position estimator 17A includes a landmark extraction block 22 and a position estimation block 28. Hereinafter, the orientation of the vehicle at the reference time t outputted by the orientation sensor 5 is expressed by "$\theta_t$" and the estimated value of the own vehicle position at the reference time t outputted by the position estimation block 28 is expressed by "$\bar{x}_t=(\bar{x}_t, \bar{y}_t)$".

The landmark extraction block 22 includes a search candidate selection block 41, an estimated measurement value calculation block 42, a search range narrowing block 43 and an extraction block 44 and outputs the position vector $m^k$ of the reference landmark Lk and the measurement value $z_t^k$ that is scan data of the reference landmark Lk outputted by the LIDAR 2.

Specifically, the search candidate selection block 41 according to the first embodiment specifies the scan range Rsc based on the prior estimated value $x^-_t$ supplied from the state transition model block 20. Instead, the search candidate selection block 41 according to the second embodiment first calculates, on the basis of the geometric relationship illustrated in FIG. 6, a temporally-estimated value of the own vehicle position on the x-y coordinate system in the same way as the state transition model block 20 according to the first embodiment. Specifically, with reference to the equation (2), the search candidate selection block 41 calculates a temporally-estimated value of the own vehicle position on the x-y coordinate system on the basis of the estimated value) $x^-_{t-1}$ estimated by the position estimation block 28 at the last time, the orientation $\theta_{t-1}$ measured at the last time and the control value $ut=(v_t, \omega_t)^T$. Then, the search candidate selection block 41 specifies the scan range Rsc based on the temporally-estimated value of the own vehicle position on the x-y coordinate system and the orientation $\theta_t$. Specifically, the search candidate selection block 41 determines an area that is within a margin of plus or minus 90 degree angle from the orientation $\theta_t$ and within the maximum ranging distance of the LIDAR 2 from the calculated x-y coordinates of the own vehicle position. Then, the search candidate selection block 41 extracts from the map DB 10 the position vector $m^k$ of the landmark indicating the position within the specified area.

With reference to the equations (5) and (7), the estimated measurement value calculation block 42 calculates the estimated value $\hat{z}_t^k=(\hat{r}_t^k, \hat{\phi}_t^k)^T$ corresponding to the measurement value $z_t^k$ based on the temporally-estimated value (corresponds to the prior estimated value $x^-_t$ according to the first embodiment) of the own vehicle position on the x-y coordinate system calculated by the search candidate selection block 41 and the position vector $m^k$ extracted from the map DB 10. It is noted that, at the time of referring to the equations (5) and (7), the estimated measurement value calculation block 42 uses the temporally-estimated value of the own vehicle position on the x-y coordinate system calculated by the search candidate selection block 41 instead of the prior estimated value $x^-_t=(x^-_t, y^-_t)$ and uses the orientation $\theta_t$ instead of the orientation $\theta^-_t$. Then, the search range narrowing block 43 determines the search range Rtag indicated by the equations (13) and (14). When there is a measurement value $z_t^i$ ($z_t^k$ in this case) having a combination ($r_t^i$, $\phi_t^i$) satisfying the equations (13) and (14), the extraction block 44 supplies the measurement value and its position vector $m^k$ to the position estimation block 28. Preferably, in this case, as with the first embodiment, the extraction block 44 may further execute the process of selecting the scan data corresponding to the reference landmark Lk from the scan data included in the search range Rtag to determine the measurement value $z_t^k$ to supply.

The position estimation block 28 calculates the estimated value $\bar{x}_t=(\bar{x}_t, \bar{y}_t)$ of the own vehicle position based on the position vector $m^k$ and the measurement value $z_t^k=(r_t^k, \phi_t^k)^T$ which are supplied from the extraction block 44 and the orientation $\theta_t$ outputted by the orientation sensor 5. Specifically, at the time when the absolute value $|\theta_t+\phi_t^k|$ is smaller than 90 degree, the position estimation block 28 calculates the estimated value $\bar{x}_t=(\bar{x}_t, \bar{y}_t)$ based on the following equations (15) and (16).

[Fifteenth Equation]
$$\bar{x}_t = m_{k,x} - \frac{r_t^k}{\sqrt{1+\tan^2(\phi_t^k+\theta_t)}} \quad (15)$$

[Sixteenth Equation]
$$\bar{y}_t = m_{k,y} - (m_{k,x}-\bar{x}_t)\cdot\tan(\phi_t^k+\theta_t) \quad (16)$$

In contrast, at the time when the absolute value $|\theta_t+\phi_t^k|$ is larger than 90 degree, the position estimation block 28 calculates the estimated value $\bar{x}_t=(\bar{x}_t, \bar{y}_t)$ based on the following equation (17) and the above-mentioned equation (16).

[Seventeenth Equation]
$$\bar{x}_t = m_{k,x} + \frac{r_t^k}{\sqrt{1+\tan^2(\phi_t^k+\theta_t)}} \quad (17)$$

Besides, at the time when the absolute value $|\theta_t+\phi_t^k|$ is 90 degree, the position estimation block 28 calculates the estimated value $\bar{x}_t=(\bar{x}_t, \bar{y}_t)$ based on the following equation (18) and the above-mentioned equation (16).

[Eighteenth Equation]
$$\bar{x}_t=m_{k,x} \quad (18)$$

Here, a description will be given of the derivation approaches of the equations (15) to (18).

First, since the distance $r_t^k$ and the scan angle $\phi_t^k$ have a geometric relationship illustrated in FIG. 7 mentioned above as with the distance $\hat{r}_t^k$ and the scan angle $\hat{\phi}_t^k$, each of the distance $r_t^k$ and the scan angle $\phi_t^k$ has a relationship with the estimated value $\bar{x}_t=(\bar{x}_t, \bar{y}_t)$ and the orientation $\theta^-_t$ as indicated by the above mentioned equations (5) and (6). The following equation (19) corresponds to a variation of the equation (6) and the following equation (20) corresponds to a variation of the equation (5).

[Nineteenth Equation]
$$m_{k,y}-\bar{y}_t=(m_{k,x}-\bar{x}_t)\cdot\tan(\phi_t^k+\theta_t) \quad (19)$$

[Twentieth Equation]
$$(m_{k,x}-\bar{x}_t)^2+(m_{k,y}-\bar{y}_t)^2=(r_t^k)^2 \quad (20)$$

Then, by substituting the equation (19) into the equation (20), the following equation (21) can be acquired.

[Twenty-first Equation]

$$(m_{k,x} - \bar{x}_t)^2 = \frac{(r_t^k)^2}{1 + \tan^2(\phi_t^k + \theta_t)} \quad (21)$$

$$m_{k,x} - \bar{x}_t = \pm \frac{r_t^k}{\sqrt{1 + \tan^2(\phi_t^k + \theta_t)}}$$

Figure 14A:
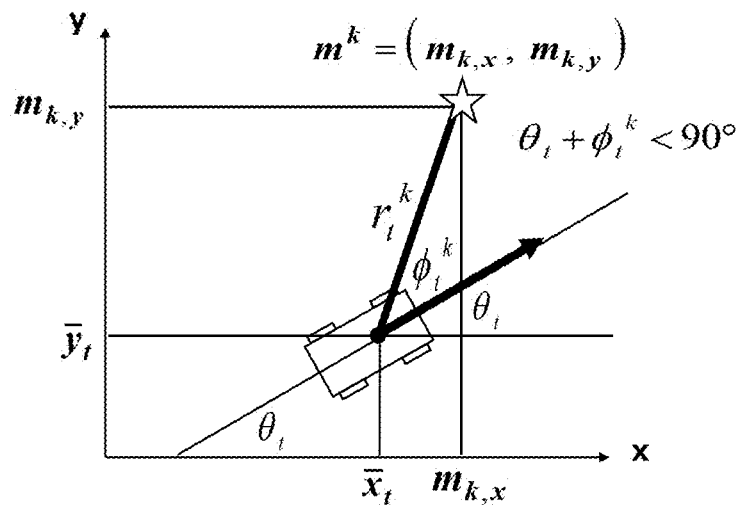
FIGS. 14A-14C illustrate a relationship between the position of a landmark and the own vehicle position.
Figure 14B:
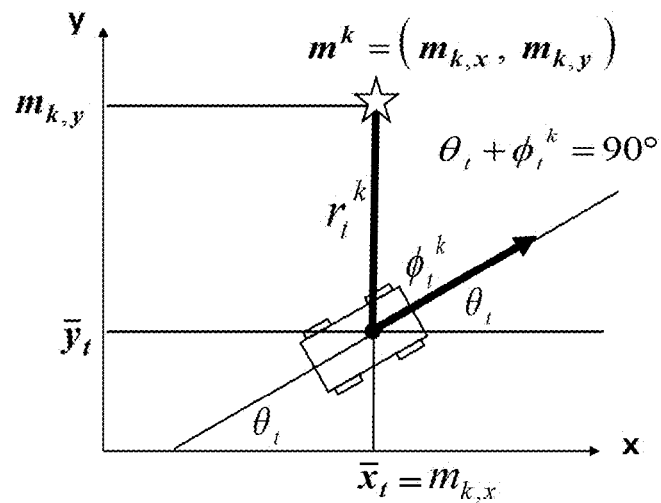
Figure 14C:
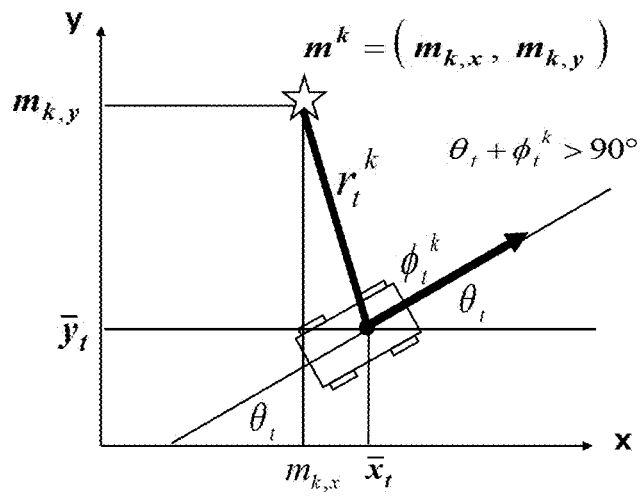

Since the equation (21) includes the sign "±", it is necessary to consider the equation (21) depending on the magnitude relationship between the x coordinate value "$\bar{x}_t$" of the estimated value $\bar{x}_t$ and the x coordinate value "$m_{k,x}$" of the position vector $m^k$. FIGS. 14(A) to 14(C) illustrates magnitude relationships between the x coordinate value "$\bar{x}_t$" of the estimated value $\bar{x}_t$ and the x coordinate value "$m_{k,x}$" of the position vector $m^k$. Specifically, FIG. 14A illustrates the magnitude relationship in a case where the x coordinate value "$m_{k,x}$" of the position vector $m^k$ is larger than the x coordinate value "$\bar{x}_t$" of the estimated value $\bar{x}_t$. FIG. 14A illustrates a case where the x coordinate value "$m_{k,x}$" of the position vector $m^k$ is larger than the x coordinate value "$\bar{x}_t$" of the estimated value $\bar{x}_t$. FIG. 14B illustrates a case where the x coordinate value "$m_{k,x}$" of the position vector $m^k$ is equal to the x coordinate value "$\bar{x}_t$" of the estimated value $\bar{x}_t$. FIG. 14C illustrates a case where the x coordinate value "$m_{k,x}$" of the position vector $m^k$ is smaller than the x coordinate value "$\bar{x}_t$" of the estimated value $\bar{x}_t$.

As illustrated in FIG. 14A, "$\theta_t + \phi_t^k$" is equal to or smaller than 90 degree angle, the inequality "$\bar{x}_t < m_{k,x}$" is satisfied. In contrast, as illustrated in FIG. 14B, "$\theta_t + \phi_t^k$" is equal to 90 degree angle, the equality "$\bar{x}_t = m_{k,x}$" is satisfied. Furthermore, as illustrated in FIG. 14C, "$\theta_t + \phi_t^k$" is larger than 90 degree angle, the inequality "$\bar{x}_t > m_{k,x}$" is satisfied.

Thus, the following relationships are provided including the case of "$\theta_t + \phi_t^k$" being negative.

$$|\theta_t + \phi_t^k| < 90° \to \bar{x}_t < m_{k,x} \quad (a)$$

$$|\theta_t + \phi_t^k| = 90° \to \bar{x}_t = m_{k,x} \quad (b)$$

$$|\theta_t + \phi_t^k| > 90° \to \bar{x}_t > m_{k,x} \quad (b)$$

In the case of the above (a), since the left-hand side of the equation (21) is positive, the sign of the right-hand side thereof is also "+", which leads to the above equation (15). In the case of the above (b), the relationship "$\bar{x}_t = m_{k,x}$" is satisfied. In the case of the above (c), since the left-hand side of the equation (21) is negative, the sign of the right-hand side thereof is also "−", which leads to the above equation (17). It is noted that the y coordinate value "$\bar{y}_t$" of the estimated value $\bar{x}_t$ is expressed as the equation (16) by transforming the equation (19).

As described above, according to the second embodiment, by using the orientation $\theta_t$ acquired from the orientation sensor 5, the own position estimator 17A can suitably calculate the estimated value $\bar{x}_t = (\bar{x}_t, \bar{y}_t)$ of the own vehicle position from the position vector $m^k$ of the landmark registered on the map DB 10 and the measurement value $z_t^k = (r_t^k, \phi_t^k)^T$.

In case the own position estimator 17A cannot establish a correspondence between the position vector $m^k$ of a landmark registered on the map DB 10 and the scan data of the LIDAR 2, the own position estimator 17A sets the temporally-estimated value of the x-y coordinates of the own vehicle position calculated by the search candidate selection block 41 as the estimated value $\bar{x}_t = (\bar{x}_t, \bar{y}_t)$ of the own vehicle position. Namely, in this case, the estimated value $\bar{x}_t = (\bar{x}_t, \bar{y}_t)$ of the own vehicle position is an estimated value calculated on the basis of the estimated value) $\bar{x}_{t-1} = (\bar{x}_{t-1}, \bar{y}_{t-1})$ of the own vehicle position estimated by the position estimation block 28 at the last time, the control value $u_t$ measured at the reference time t by the vehicle speed sensor 4 and the gyroscope sensor 3 and the orientation $\theta_{t-1}$ measured at the last time.

<Modifications>

Hereinafter, a description will be given of preferred modifications of the first and the second embodiments.

(First Modification)

The search candidate selection block 41 according to the first and the second embodiments may extract from the map DB 10 the position vectors of multiple landmarks situated in the scan range Rsc to cross-check them against the scan data of the LIDAR 2.

Generally, at the time when the vehicle is traveling, since there are obstacles such as other vehicle in front of or at the side of the own vehicle, there occurs such a situation (i.e., occlusion) that the scan data of the reference landmark Lk selected from the map DB 10 cannot be obtained from the LIDAR 2. Above things considered, according to this modification, the search candidate selection block 41 extracts, from the map DB 10, the position vectors of multiple landmarks situated in the scan range Rsc. Accordingly, even when an occlusion occurs against any one of the landmarks, the search candidate selection block 41 performs the own vehicle position estimation based on other landmark(s) having no occlusion. Thus, it is possible to detect the reference landmark Lk needed for own vehicle position estimation with a high probability. It is noted that, in such a case that multiple landmarks can be extracted and all of them can be used, the measuring/updating step can be performed multiple times (i.e., the prior estimated value can be corrected by use of multiple landmarks). In this case, it is possible to increase the estimation accuracy of the own vehicle position in a statistical manner.

A supplemental explanation of the modification will be described with reference to FIG. 11. At step S202, when the landmark extraction block 22 determines, with reference to the map DB 10, that there are multiple landmarks are situated in the scan range Rsc, the landmark extraction block 22 selects the position vectors of more than one landmarks from the map DB 10. Then, at step S203, the measurement model block 23 calculates the estimated measurement values of the selected position vectors. Then, at step S204 and step S205, the landmark extraction block 22 determines each search range Rtag according to the equations (13) and (14) with respect to each of the calculated estimated measurement values and tries to extract the scan data matched with each selected landmark in each search range Rtag. When the extraction process is successfully executed, the landmark extraction block 22 outputs the measurement value and the position vector corresponding to the matched scan data at step S207.

A supplemental description will be given with reference to FIG. 10 of the process at the time when multiple landmarks can be extracted and all of them can be used. In this case, multiple landmarks are extracted at the landmark extraction process at step S104 and the positive determination "YES" is made at step S105. The following series of process corresponding to step S106 to S109 are to be performed for each of extracted landmarks, and the above series of the process are repeatedly executed by the number of extracted landmarks based on the data corresponding to output at step S207 regarding each landmark.

(Second Modification)

The own position estimator 17A according to the second embodiment may estimate the orientation $\theta_t$ based on the output of the gyroscope sensor 3 instead of specifying the orientation $\theta_t$ based on the output of the orientation sensor 5.

In this case, in a similar way as FIG. 6 and the equation (2), the own position estimator 17A calculates an estimated value of the orientation $\theta_t$ at the reference time by adding the value ($\omega_t \Delta t$) to the orientation $\theta_{t-1}$ calculated at the last time around, wherein the own position estimator 17A calculates the value ($\omega_t \Delta t$) by multiplying the angular rate $\omega$ by the time duration $\Delta t$ between the time t−1 and the time t. Even according to this example, as with the second embodiment, it is possible to suitably calculate the estimated value $\bar{x}_t$ of own vehicle position without using any Bayesian estimation such as extended Kalman filter.

(Third Modification)

According to the above explanation, the measurement value $z_t^k$ of the landmark with the index k by the LIDAR 2 is a vector value whose elements are the distance "$r_t^k$" and the scan angle "$\phi_t^k$" of the landmark with the index k on the assumption that the front direction of the vehicle is 0 degree angle of the scan angle $\phi_t^k$. There are, however, LIDAR products which output coordinate values in the three dimensional space into which the distance and the angle to the object are converted. For example, a LIDAR which scans two dimensional space outputs data in the form of Cartesian coordinates such as $\bar{x}_t^k = r_t^k \cos \phi_t^k$, $y_t^k = r_t^k \sin \phi_t^k$ in which the distance $r_t^k$ and the angle $\phi_t^k$ are used. For example, the above-explained method according to the present invention can also be applied to such LIDAR products which output such a form of data after simply reconverting the coordinate values $x_t^k$ and $y_t^k$ into the distance $r_t^k$ and the angle $\phi_t^k$.

(Fourth Modification)

Instead of the configuration that the storage unit 12 of the vehicle mounted device 1 stores the map DB 10, a server device may store the map DB 10. In this case, the vehicle mounted device 1 acquires the necessary landmark information by communicating with the server device through a communication unit.

BRIEF DESCRIPTION OF REFERENCE NUMBERS

1 Vehicle mounted device
2 LIDAR
3 Gyroscope sensor
4 Vehicle speed sensor
5 Orientation sensor
10 Map DB

The invention claimed is:

1. An estimation device comprising:
a storage medium configured to store a program and map information; and
a central processing unit (CPU) coupled to the storage medium and configured to execute the program to:
acquire map information from the storage medium;
acquire first information, wherein the first information indicates a distance and an angle to an object situated within a first range at a reference time;
calculate a first estimated position, wherein the first estimated position is an estimated position of a moving body at the reference time;
determine second information based on the first estimated position and the acquired map information, wherein the second information indicates a positional relationship, at the reference time, between the first estimated position and a position of the object indicated by position information of the object included in the acquired map information;
determine a correction valued based on calculating the difference between the first information and the second information; and
update the first estimated position of the moving body based on adding the determined correction value to the first estimated value, wherein the updated first estimated position is an updated estimated position of the moving body at the reference time.

2. The estimation device according to claim 1, wherein the CPU is further configured to execute the program to calculate the first estimated position at least based on a position of the moving body estimated a predetermined time before the reference time.

3. The estimation device according to claim 2, wherein the CPU is further configured to execute the program to
acquire control information of the moving body; and
calculate the first estimated position based on the position estimated the predetermined time before the reference time and the control information of the moving body_.

4. The estimation device according to claim 2, wherein a predicting step, in which the CPU executes the program to calculate the first estimated position, and an updating step, in which the CPU executes the program to update the first estimated position calculated at the predicting step based on the difference between the first information and the second information, are alternately executed, and
wherein at the predicting step, the CPU executes the program to calculate the first estimated position based on a prior first estimated position updated at a previous updating step prior to the predicting step.

5. The estimation device according to claim 1, wherein the CPU is further configured to execute the program to acquire the first information from a measurement device which includes an emitting unit, a light receiving unit and an output unit, the emitting unit emitting laser light while changing outgoing direction of the laser light, the light receiving unit receiving the laser light reflected by the object, the output unit outputting the first information based on a light receiving signal outputted by the light receiving unit and the outgoing direction of the laser light received by the light receiving unit and a response delay time of the laser light.

6. The estimation device according to claim 1, wherein the object is an artificial object.

7. The estimation device according to claim 6, wherein the object is an artificial object periodically arranged.

8. A control method executed by an estimation device comprising:
acquiring map information;
calculating a first estimated position, wherein the first estimated position is an estimated position of a position of the moving body at a reference time;
acquiring first information, wherein the first information indicates a distance and an angle to an object situated within a first range at the reference time;
determining second information based on the first estimated position and the acquired map information, wherein the second information indicates a positional relationship, at the reference time, between the first estimated position and a position of the object indicated by position information of the object included in the acquired map information;

determining a correction valued based on calculating the difference between the first information and the second information; and updated the first estimated position of the moving body based on adding the determined correction value to the first estimated value, wherein the updated first estimated position is an updated estimated position of the moving body at the reference time.

9. A non-transitory storage medium storing a program, the program, when executed by a computer, the program causing the computer to:

acquire map information;

calculate a first estimated position, wherein the first estimated position is an estimated position of a position of the moving body at a reference time;

acquire first information, wherein the first information indicates a distance and an angle to an object situated within a first range at the reference time;

determine second information based on the first estimated position and the acquired map information, wherein the second information indicates a positional relationship, at the reference time, between the first estimated position and a position of the object indicated by position information of the object included in the acquired map information;

determine a correction valued based on calculating the difference between the first information and the second information; and update the first estimated position of the moving body based on adding the determined correction value to the first estimated value, wherein the updated first estimated position is an updated estimated position of the moving body at the reference time.

* * * * *